United States Patent
Tamura et al.

(10) Patent No.: US 7,275,367 B2
(45) Date of Patent: Oct. 2, 2007

(54) EXHAUST PRESSURE-RAISING DEVICE FOR AN INTERNAL COMBUSTION ENGINE

(75) Inventors: Yasuki Tamura, Nisshin (JP); Motoyuki Suzuki, Obu (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 226 days.

(21) Appl. No.: 11/017,726

(22) Filed: Dec. 22, 2004

(65) Prior Publication Data

US 2005/0138923 A1 Jun. 30, 2005

(30) Foreign Application Priority Data

Dec. 24, 2003 (JP) ............... 2003-427421

(51) Int. Cl.
*F01N 7/00* (2006.01)
(52) U.S. Cl. ............ 60/324; 60/292; 137/599.01; 137/599.11; 137/599.16
(58) Field of Classification Search .......... 60/292, 60/324; 123/323; 137/599.01, 599.09, 599.11, 137/599.16, 599.17; 188/154, 273
See application file for complete search history.

(56) References Cited

U.S. PATENT DOCUMENTS

| | | | | |
|---|---|---|---|---|
| 4,682,674 A | * | 7/1987 | Schmidt | 188/273 |
| 5,372,109 A | * | 12/1994 | Thompson et al. | 123/323 |
| 5,638,926 A | * | 6/1997 | McCrickard | 188/273 |
| 6,109,027 A | * | 8/2000 | Schaefer | 60/324 |
| 6,179,096 B1 | * | 1/2001 | Kinerson et al. | 188/154 |
| 6,273,058 B1 | * | 8/2001 | Wagner | 123/323 |
| 6,647,710 B2 | * | 11/2003 | Nishiyama et al. | 60/286 |
| 6,729,123 B2 | * | 5/2004 | Tamura et al. | 60/285 |
| 6,810,850 B2 | * | 11/2004 | Anderson et al. | 123/323 |
| 6,817,172 B2 | * | 11/2004 | Tamura | 60/285 |
| 6,981,519 B2 | * | 1/2006 | Heckt et al. | 137/599.18 |

FOREIGN PATENT DOCUMENTS

WO WO-92/00445 A1 1/1992

* cited by examiner

*Primary Examiner*—Tu M. Nguyen
(74) *Attorney, Agent, or Firm*—Birch, Stewart, Kolasch & Birch, LLP (57) ABSTRACT

There is provided an exhaust pressure-adjusting valve that is brought into a closed position due to a biasing force of a resilient body and is opened against the biasing force of the resilient body due to the exhaust pressure in an exhaust channel, which is raised in response to the closing of a throttle valve, in which valve-opening area is increased or decreased according to the displacement of the resilient body, to thereby adjust the exhaust pressure. The exhaust pressure-adjusting valve has a unit for changing the growth rate of the valve-opening area, which gradually heightens the growth rate of the valve-opening area with respect to the displacement of the resilient body in a valve-opening direction.

11 Claims, 5 Drawing Sheets

EXHAUST PRESSURE-RAISING DEVICE FOR AN INTERNAL COMBUSTION ENGINE

CROSS-REFERENCE TO THE RELATED ART

This application incorporates by reference the subject matter of Application No. 2003-427421, filed in Japan on Dec. 24, 2003, on which a priority claim is based under 35 U.S.C. §119(a).

BACKGROUND OF THE INVENTION

1. Field of the Invention

The present invention relates to an exhaust pressure-raising device for an internal combustion engine, and more specifically to a technology for achieving both the effect of improving the exhaust emission quality and the combustion stability or the fuel consumption efficiency at the same time.

2. Description of the Related Art

It is known that if exhaust pressure in an exhaust system (from a combustion chamber to an exhaust pipe) is raised by using an exhaust pressure-raising device comprising, for example, an exhaust throttle valve, a reaction of unburnt materials (HC, CO and the like) and oxygen is promoted in the exhaust system, which makes realizable a reduction in emissions of hazardous substances at the time of starting the engine in the cold state and the early activation of catalysts.

In order to obtain the full effect of improving the exhaust emission quality, it is required that the exhaust pressure be set equal to or higher than the prescribed exhaust pressure (800 hPa, for example). Too high exhaust pressure, however, incurs deterioration in the combustion quality, attributable to an increase in the internal EGR and the like, and a decrease in fuel consumption efficiency, attributable to an increase in exhaust resistance. Therefore, the exhaust pressure must be regulated within a prescribed range.

The exhaust pressure, however, is influenced by effective exhaust-channel sectional area (exhaust throttle amount), an exhaust flow rate, and exhaust temperature. Even if the exhaust throttle valve is operated at the same throttle amount, the exhaust pressure varies along with a change in the exhaust flow rate or in exhaust temperature. For that reason, the exhaust pressure-raising device is generally provided with an exhaust pressure-adjusting valve, such as a relief valve, in addition to an exhaust throttle valve, and by using the exhaust pressure-adjusting valve, the exhaust pressure is regulated within the prescribed range.

In general, the exhaust throttle valve is made of a butterfly valve, and the exhaust pressure-adjusting valve is constructed by using a resilient body, such as a spring. This simplifies the construction, thereby improving the mountability of the exhaust pressure-raising device on a vehicle and cutting costs. At the same time, the exhaust pressure is made to be adjustable under favor of the fact that the throttle amount (valve-opening area) corresponding to the exhaust pressure (load) can be obtained due to the properties of the resilient body. For instance, there is a well-known exhaust pressure-raising device with a construction in which an exhaust pressure-adjusting valve is composed of a reed valve formed in the shape of an a plate spring, and the reed valve is attached to a butterfly valve (see Publication No. WO92/00445).

To regulate the exhaust pressure within a prescribed range and to achieve both the combustion stability or the fuel consumption efficiency and the effect of improving the exhaust emission quality at the same time, it is required that the exhaust pressure be maintained substantially constant with regard to the relation of the exhaust flow rate and the exhaust pressure by increasing the exhaust pressure right up to a prescribed value (800 hPa, for example) at least when the exhaust flow rate is equal to a prescribed value (which is a relatively small exhaust flow rate), and by suppressing a rise amount of the exhaust pressure with respect to the exhaust flow rate down to a prescribed amount or less when the exhaust flow rate is equal to or higher than the prescribed value.

To this end, it is considered that a change characteristic of the valve-opening area of the exhaust pressure-adjusting valve with respect to the exhaust flow rate needs to be a prescribed characteristic that fulfills the above requirements.

From this standpoint, the requirements are fully satisfied if a relief valve whose opening is freely adjustable is utilized as an exhaust pressure-adjusting valve.

On the other hand, the relief valve that is freely adjustable has to be operated by an actuator or the like. Moreover, being an exhaust component, the relief valve is required to have high heat resistance, which entails high cost.

On the contrary, as disclosed in the above Publication and the like, utilizing a resilient body makes it possible to actualize an exhaust pressure-adjusting valve with a simple construction at low cost.

A displacement characteristic of a resilient body with respect to the exhaust pressure, however, is automatically determined once materials (resilient modulus) of the resilient body are decided. Consequently, in case that a resilient body is used, the materials of the resilient body uniquely determines the relation of the exhaust flow rate and the valve-opening area, which produces the problem that the degree of freedom thereof is low and that the prescribed characteristics that meets the above requirements cannot be fully obtained.

SUMMARY OF THE INVENTION

The present invention has been made to resolve the above problems. The present invention provides an exhaust pressure-raising device for an internal combustion engine capable of achieving both an effect of improving an exhaust emission quality and combustion stability or fuel consumption efficiency at the same time with a simple construction at low cost.

To accomplish this, the exhaust pressure-raising device for an internal combustion engine according to the present invention comprises a throttle valve that is disposed in an exhaust channel of an internal combustion engine and is closed to reduce channel area of the exhaust channel and raise exhaust pressure in the exhaust channel, and an exhaust pressure-adjusting valve that is brought into a closed position due to a biasing force of a resilient body and is opened against the biasing force of the resilient body due to the exhaust pressure in the exhaust channel, which is raised in response to the closing of the throttle valve, in which valve-opening area is increased or decreased according to displacement of the resilient body, to thereby adjust the raised exhaust pressure, the device in which the exhaust pressure-adjusting valve has means for changing the growth rate of the valve-opening area, which alters the growth rate of the valve-opening area with respect to the displacement of the resilient body in a valve-opening direction.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

Embodiments of the present invention will be described below with reference to attached drawings.

Firstly, a first embodiment will be explained.

Figure 1:
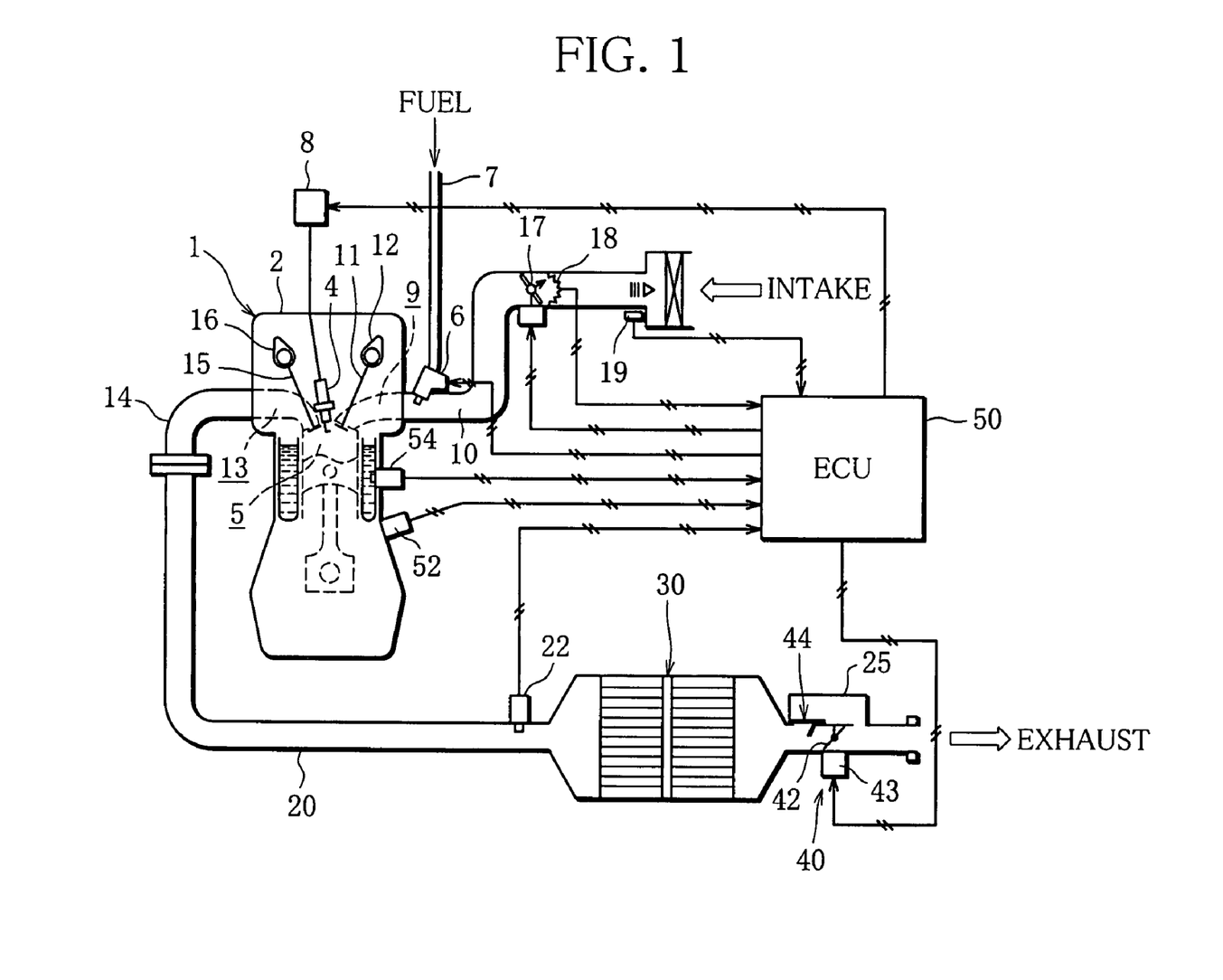
FIG. 1 is a view showing a system construction of an internal combustion engine including an exhaust pressure-raising device according to the present invention, which is installed in a vehicle.

FIG. 1 schematically shows a system construction of an internal combustion engine including an exhaust pressure-raising device according to the present invention, which is installed in a vehicle.

As illustrated in FIG. 1, an intake-manifold injection (multipoint injection: MPI) type gasoline engine is employed as an engine body (hereinafter referred to as engine) 1 functioning as an internal combustion engine.

In a cylinder head 2 of the engine 1, an ignition plug 4 is attached to each cylinder, and an ignition coil 8 for outputting high voltage is connected to the ignition plug 4.

In the cylinder head 2, an intake port 9 is provided to each cylinder. An intake valve 11 is formed in each intake port 9 at an end close to a combustion chamber 5, the intake valve 11 being operated to open and close along with a cam of a cam shaft 12 that rotates according to engine revolution and makes the intake port 9 communicate with or disconnected from the combustion chamber 5. Also, one end of an intake manifold 10 is connected to each intake port 9. Attached to the intake manifold 10 is an electromagnetic fuel injection valve 6. A fuel supply device, not shown, having a fuel tank is connected to the fuel injection valve 6 through a fuel pipe 7.

Upstream from the fuel injection valve 6 of the intake manifold 10, there is disposed an electromagnetic throttle valve 17 for adjusting an intake air amount and a throttle position sensor (TPS) 18 for detecting the opening of the throttle valve 17. In addition, an air flow sensor 19 for detecting the intake air amount is arranged upstream from the throttle valve 17.

In the cylinder head 2, an exhaust port 13 is provided to each cylinder to extend in a substantially horizontal direction. Formed in each exhaust port 13 at an end close to the combustion chamber 5 is an exhaust valve 15, which is operated to open and close along with a cam of a cam shaft 16 that rotates according to engine revolution and makes the exhaust port 13 communicate with or disconnected from the combustion chamber 5. One end of an exhaust manifold 14 is connected to each exhaust port 13.

Since the MPI engine is well known, the detailed explanation about the construction thereof will be omitted.

Connected to the other end of the exhaust manifold 14 is an exhaust pipe (exhaust channel) 20. A three-way catalytic converter 30 is interposed in the exhaust pipe 20 as an exhaust emission-controlling catalyst device. Furthermore, an $O_2$ sensor 22 for detecting oxygen concentration is arranged upstream from the three way catalytic converter 30 in the exhaust pipe 20.

Interposed downstream from the three-way catalytic converter 30 in the exhaust pipe 20 is an exhaust pressure-raising valve unit 40 according to the first embodiment of the exhaust pressure-raising device of the present invention.

The exhaust pressure-raising valve unit 40 is designed chiefly to encourage a reduction of hazardous substances (including NOx, smoke, $H_2$ and the like, in addition to unburnt materials, such as HC and CO) contained in exhaust emission and is so constructed as to be capable of changing the exhaust pressure in an exhaust system. To be concrete, the exhaust pressure-raising valve unit 40 includes a butterfly valve (throttle valve) 42 capable of adjusting channel area of the exhaust pipe 20, a bypass channel 25, and an exhaust pressure-adjusting valve 44 that closes and opens the bypass channel 25.

An actuator 43 is provided to the butterfly valve 42, and the butterfly valve 42 is operated by the actuator 43 to open and close. Although the butterfly valve 42 is applied here, various kinds of enclosed type opening/closing valves may be utilized in place of the butterfly valve 42.

The bypass channel 25 is so constructed as to extend around the butterfly valve 42, and the exhaust pressure-adjusting valve 44 is arranged in a bifurcation of the exhaust pipe 20 and the upstream side of the bypass channel 25.

An ECU 50 comprises an input/output device, memories (such as ROM, RAM and nonvolatile RAM), a central processing unit (CPU), a time counter, and the like. The ECU 50 controls the engine 1, which includes the exhaust pressure-raising device, and the like in a comprehensive manner.

Connected to an input side of the ECU 50 are various kinds of sensors including a crank angle sensor 52 for detecting a crank angle of the engine 1, a water temperature sensor 54 for detecting cooling water temperature Tw of the engine 1 and the like, besides the TPS 18, the air flow sensor 19 and the $O_2$ sensor 22. Detection information from these sensors is inputted to the ECU 50. Engine revolution speed Ne is detected, based on the crank angle information from the crank angle sensor 52.

Connected to an output side of the ECU 50 are various kinds of output devices including the fuel injection valve 6, the ignition coil 8, the throttle valve 17, the actuator 43 and the like. A fuel injection amount, fuel injection timing, ignition timing, an exhaust flow control amount, and the like, calculated on the basis of the detection information from the sensors are outputted to the output devices. By so doing, an air-fuel ratio is controlled to be a proper target air-fuel ratio, and a reasonable amount of fuel is injected from the fuel injection valve 6 at the right timing. Moreover, the ignition plug 4 carries out spark ignition at the right timing, and the butterfly valve 42 of the exhaust pressure-raising valve unit 40 is controlled in operation at the right timing to obtain desired exhaust pressure (target exhaust pressure).

Specifically, in the exhaust pressure-raising device according to the present invention, when the engine 1 is in a cold state, the butterfly valve 42 is operated to close, to thereby raise the exhaust pressure in the exhaust system (from the combustion chamber to the exhaust pipe) located upstream from the butterfly valve 42. As a result, the rise of the exhaust pressure in the exhaust system intensifies the relation of unburnt materials, such as HC and CO, and oxygen or NOx in the exhaust system, which promotes reactions. This satisfactorily prevents the exhaust of hazardous substances, such as HC, CO and NOx, and raises exhaust temperature, thereby achieving early activation of the three-way catalytic converter 30.

Figure 2:
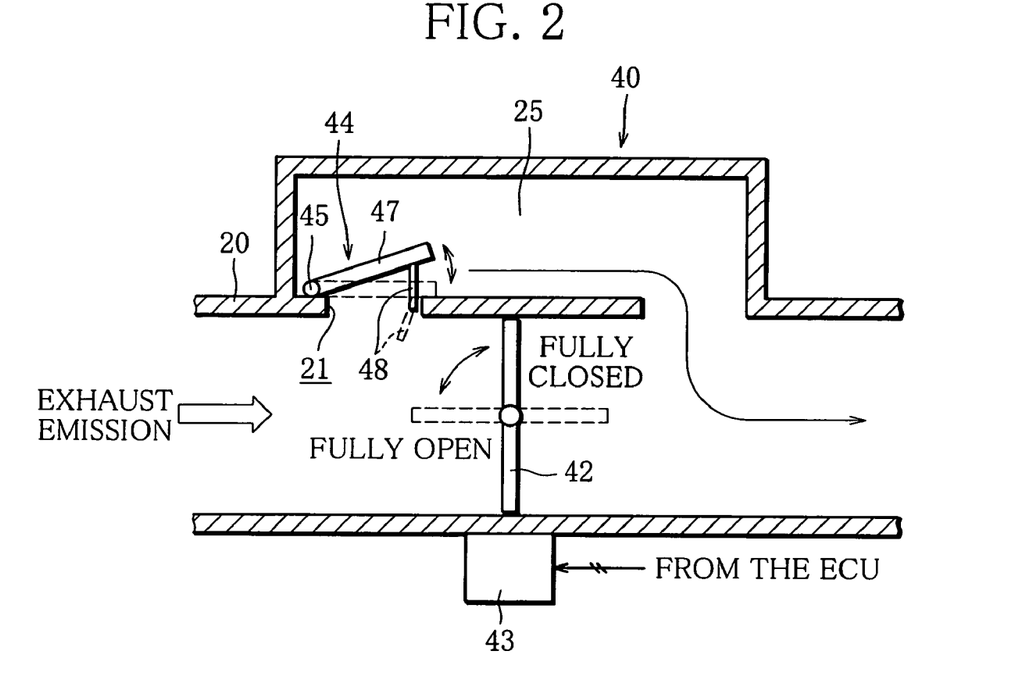
FIG. 2 is an enlarged view of an exhaust pressure-raising valve unit according to a first embodiment.
Figure 3:
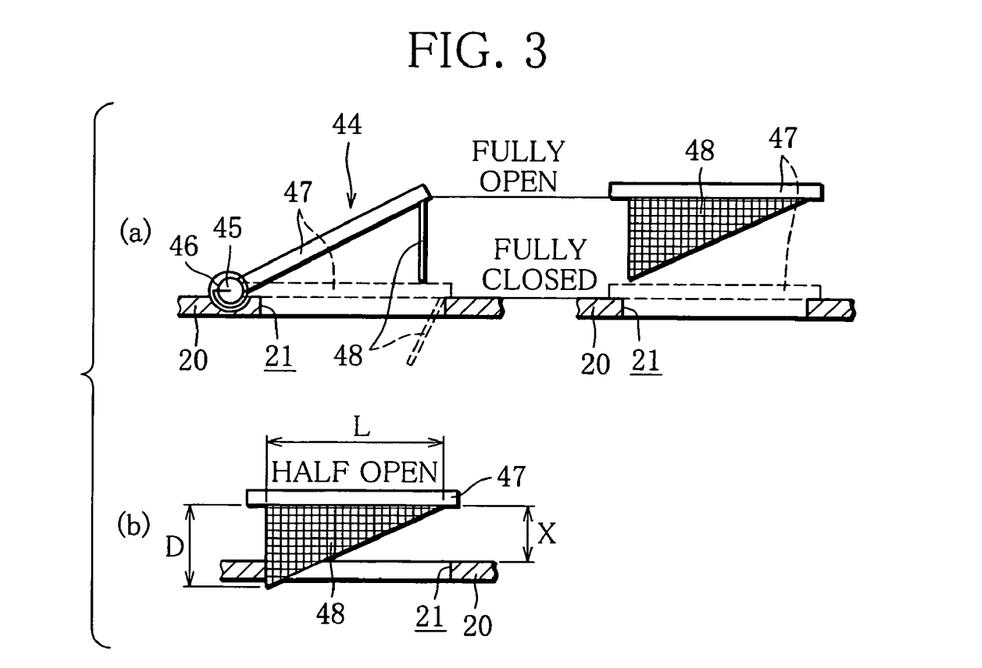
FIG. 3 is a detail view of an exhaust pressure-adjusting valve according to the first embodiment, showing a fully open position (a) and a half-open position (b)

FIG. 2 shows the butterfly valve 42, the bypass channel 25 and the exhaust pressure-adjusting valve 44 of the exhaust pressure-raising valve unit 40 in an enlarged scale. FIG. 3 is a detail view of the exhaust pressure-adjusting valve 44 according to the first embodiment, showing a fully open position (a) and a half-open position (b). Next, the exhaust pressure-adjusting valve 44 according to the first embodiment will be described in detail with reference to FIGS. 2 and 3.

As illustrated in FIGS. 2 and 3, the exhaust pressure-adjusting valve 44 includes an opening hole 21 formed in a bifurcation of the exhaust pipe 20 and the upstream side of the bypass channel 25. The exhaust pressure-adjusting valve 44 is constructed such that the opening hole 21 is operated to open or close by a valve element 47.

Specifically, a turning shaft 45 is supported in an outer circumferential surface of the exhaust pipe 20 and is positioned upstream of the exhaust flow from the opening hole 21 to sit near a circumferential edge of the opening hole 21. The exhaust pressure-adjusting valve 44 is constructed by coupling a terminal end of the valve element 47 to the turning shaft 45. More specifically, a coil spring (resilient body) 46 is interposed in between the turning shaft 45 (or the terminal end portion of the valve element 47) and the outer circumferential surface of the exhaust pipe 20, and the valve element 47 is biased to the circumferential edge of the opening hole 21 due to a biasing force of the coil spring 46. In other words, the exhaust pressure-adjusting valve 44 functions as a normally-closed valve because of the biasing force of the coil spring 46. Once the valve element 47 is pressed to move away from the circumferential edge of the opening hole 21, the valve element 47 turns around the turning shaft 45 according to the pressing force, resisting against the biasing force of the coil spring 46, to thereby open the exhaust pressure-adjusting valve 44.

In an end portion of the valve element 47, there is disposed a shield 48 expanding toward the opening hole 21 to form a vertical surface facing the exhaust flow.

To be concrete, as illustrated in FIG. 3, the shield 48 has a triangular shape that is obtained by cutting a rectangular plate along a diagonal line thereof, facing in a direction of the exhaust flow (means for changing the growth rate of the valve-opening area).

As a consequence, when the valve element 47 is detached from the circumferential edge of the opening hole 21 to open, the valve-opening area formed between the end of the valve element 47 and the circumferential edge of the opening hole 21 is generally widened in proportion to the opening of the exhaust pressure-adjusting valve 44, namely resilience displacement of the coil spring 46. In the exhaust pressure-adjusting valve 44, as the resilience displacement of the coil spring 46 is increased, the growth rate of the valve-opening area formed between the end of the shield 48 and the circumferential edge of the opening 21 is gradually changed. For example, the growth rate is raised by degree, and the valve-opening area is enlarged.

Specifically, as illustrated in FIG. 3(b), where L and D represent the lengths of the respective sides of the shield 48, and X denotes distance between the end of the valve element 47 and the circumferential edge of the opening hole 21, which is proportional to the resilience displacement of the coil spring 46, the valve-opening area between the end of the shield 48 and the circumferential edge of the opening hole 21 is expressed by the following equation (1). For instance, if both sides of the exhaust pressure-adjusting valve 44 are obstructed, the exhaust pressure-adjusting valve 44 is constructed such that the valve-opening area is very small at first, but is progressively increased in the order of the square of the resilience displacement of the coil spring 46.

$$\text{Valve-opening area} = (L \cdot X/D) \cdot X \cdot \tfrac{1}{2} = L/2D \cdot X^2 \qquad (1)$$

Next, the operation of the exhaust pressure-raising device thus constructed, according to the first embodiment, will be described.

For example, if the water temperature sensor 54 detects that the engine 1 is in the cold state, the ECU 50 controls the butterfly valve 42 to close. This brings the butterfly valve 42 into a fully closed position as shown by a solid line in FIG. 2. Thus the exhaust pressure in the exhaust system (from the combustion chamber to the exhaust pipe) located upstream from the butterfly valve 42 starts to increase.

Once the exhaust pressure in the exhaust system begins to rise in this way, the valve element 47 is pressed by the exhaust pressure and starts to open, and a valve-opening amount of the valve element 47 is increased along with the increase of the exhaust flow rate.

At the same time, as stated above, the valve-opening area between the end of the shield 48 and the circumferential edge of the opening hole 21 is very small at first, but is enlarged little by little on the order of the square of the resilience displacement of the coil spring 46. Therefore, as long as the exhaust flow rate is low, and the resilience displacement of the coil spring 46 is small, it is difficult for the exhaust emission to flow downstream of the exhaust pressure-adjusting valve 44, and the exhaust pressure in the exhaust system is likely to rise. On the contrary, if the exhaust flow rate becomes high, and the resilience displacement of the coil spring 46 is increased, the valve-opening area is rapidly enlarged, and therefore the exhaust emission easily flows through the exhaust pressure-adjusting valve 44 to the downstream side. Accordingly, the rate of increase of the exhaust pressure in the exhaust system drops, which prevents the rise of the exhaust pressure.

Figure 4:
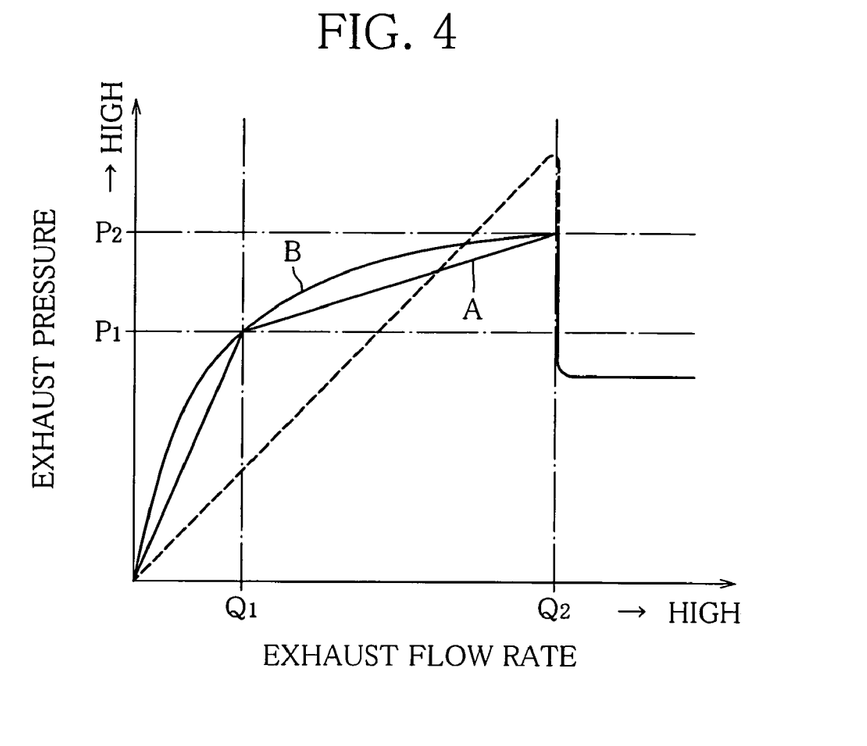
FIG. 4 is a graph showing the relation of an exhaust flow rate and exhaust pressure in case that the exhaust pressure-adjusting valve is provided with a shield (solid line) and the relation without a shield (broken line) for comparison.

FIG. 4 shows the relation of the exhaust flow rate and the exhaust pressure in case where the exhaust pressure-adjusting valve 44 is provided with the shield 48 (solid line A) and the relation without the shield 48 (broken line) for comparison. As illustrated in FIG. 4, when the exhaust pressure-adjusting valve 44 is not provided with the shield 48, the exhaust pressure is increased in proportion to the exhaust flow rate and is not maintained substantially constant. With the shield 48, however, the exhaust pressure is regulated to fall in a prescribed range to be kept substantially constant in response to a wide range of the exhaust flow rate, regardless of the increase of the exhaust flow rate.

In practice, it is preferable that the shape (the lengths of the sides L and D, and the like) of the shield 48 be determined such that when the exhaust flow rate is equal to a prescribed exhaust flow rate Q1 (first prescribed exhaust flow rate), the exhaust pressure reaches a prescribed exhaust pressure P1 (first prescribed exhaust pressure, for example, 800 hPa) that satisfactorily encourages the reactions of HC, CO, and the like, and oxygen or NOx in the exhaust system, and that the exhaust pressure is maintained within a range of from the prescribed exhaust pressure P1 to a prescribed exhaust pressure P2 (second prescribed exhaust pressure) while the exhaust flow rate is in a range of from the prescribed exhaust flow rate Q1 to a prescribed exhaust flow rate Q2 (second prescribed exhaust flow rate). Thus as illustrated in FIG. 4, the exhaust pressure is surely regulated to fall in the prescribed range (P1~P2) to be kept substantially constant in response to the wide range (Q1~Q2) of the exhaust flow rate.

Therefore, when the engine revolution speed Ne is low or the exhaust temperature is low, and the exhaust flow rate is small (for example, equal to or less than the prescribed exhaust flow rate Q1), the exhaust pressure is quickly raised, to thereby promote the reactions of the unburnt materials, such as HC and CO, and oxygen or NOx. In this manner, it is possible to realize the reduction of the exhaust amount of hazardous substances and the early activation of the three-way catalyst converter 30. On the contrary, if the engine revolution speed Ne becomes high or the exhaust temperature is increased, and the exhaust flow rate is increased (for example, above the prescribed exhaust flow rate Q1), it is possible to suppress the excessive rise of the exhaust pressure and to prevent deterioration in the combustion quality, attributable to an increase in internal EGR and the like, and a decrease in fuel consumption efficiency, attributable to an increase in exhaust resistance.

As a consequence, it is possible to provide a simple construction in which the coil spring 46 is used, and the triangular shield 48 is provided, which reduces costs, and to achieve both the effect of improving the exhaust emission quality and the combustion stability or the fuel consumption efficiency at the same time.

When the exhaust flow rate reaches the prescribed exhaust flow rate Q2, it is considered that the exhaust pressure is sufficiently high and that the exhaust temperature is also high without the butterfly valve 42. Therefore, it is desired that the butterfly valve 42 be returned to the fully open position to stop the rise of the exhaust pressure which is caused by the butterfly valve 42. In this case, the exhaust flow rate is estimated, for example, based on information about the intake air amount from the air flow sensor 19.

By so doing, as illustrated in FIG. 4, the excessive rise of the exhaust pressure is suppressed without fail, resulting in more reliable prevention of deterioration in combustion quality, attributable to an increase in the internal EGR and the like, and a decrease in fuel consumption efficiency, attributable to an increase in the exhaust resistance.

Also as illustrated in FIG. 4, the exhaust pressure has to be raised in the early stages if the shield 48 is not used (broken line), so that it is necessary to utilize a coil spring with resilient modulus high enough to allow the exhaust pressure to instantly exceed the prescribed range (P1~P2). In case that the shield 48 is used, however, the resilient modulus of the coil spring 46 is not necessarily that high, to thereby lower costs.

Next, a second embodiment will be explained below.

A difference between the second embodiment and the first, in terms of the exhaust pressure-adjusting valve 44, is the attaching position of the shield. Hereinafter, the explanation about the parts identical to those of the first embodiment will be omitted, and the parts different from those of the first embodiment will be described.

Figure 5:
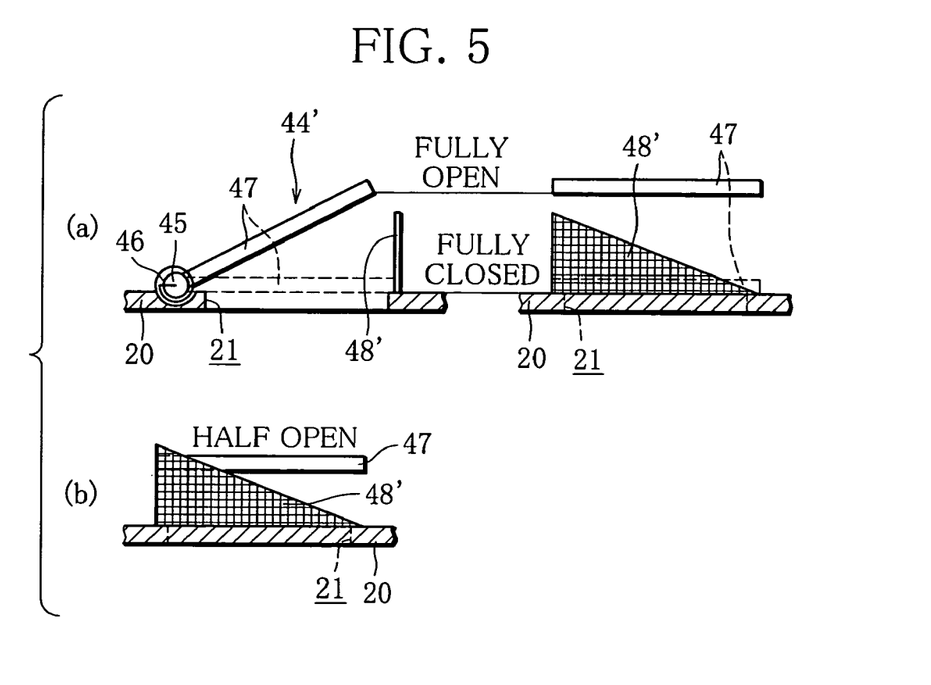
FIG. 5 is a detail view of an exhaust pressure-adjusting valve according to a second embodiment, showing a fully open position (a) and a half-open position (b)

FIG. 5 is a detail view of an exhaust pressure-adjusting valve 44' according to the second embodiment, showing a fully open position (a) and a half-open position (b). The details about the exhaust pressure-adjusting valve 44' according to the second embodiment will be described below with reference to FIG. 5.

As illustrated in FIG. 5, in the exhaust pressure-adjusting valve 44', a shield 48' is disposed upright not in the end of the valve element 47 but in the outer circumferential surface of the exhaust pipe 20 to be positioned downstream of the exhaust flow from the opening hole 21 to sit at the circumferential edge of the opening hole 21.

In other words, the shield 48' has a triangular shape obtained by cutting a rectangular plate along the diagonal line thereof, just like the shield 48 of the first embodiment. The shield 48' is arranged upright in the outer circumferential surface of the exhaust pipe 20 to be aligned with the end of the valve element 47, just like the shield 48 turned upside down.

Even if the exhaust pressure-adjusting valve 44' is thus constructed, the valve-opening area between the end of the valve element 47 and the end of the shield 48' is very small at first, but is increased on the order of the square of the resilience displacement of the coil spring 46 by degree as in the first embodiment. Therefore, as long as the exhaust flow rate is low, and the resilience displacement of the coil spring 46 is small, it is difficult for the exhaust emission to flow downstream of the exhaust pressure-adjusting valve 44', and the exhaust pressure in the exhaust system is easily increased. On the contrary, when the exhaust flow rate gets higher, and the resilience displacement of the coil spring 46 is increased, the valve-opening area is increased at speed, and the exhaust emission smoothly flows downstream through the exhaust pressure-adjusting valve 44'. Accordingly, the rate of increase of the exhaust pressure in the exhaust system falls, thereby suppressing the rise of the exhaust pressure.

As a consequence, the second embodiment has the same advantages as the first embodiment.

Next, a third embodiment will be described below.

The third embodiment is different in that the shield 48' of the exhaust pressure-adjusting valve 44' of the second embodiment is improved. The explanation about the parts identical to those of the first and second embodiments will be omitted, and only the parts different from those of the second embodiment will be described.

Figure 6:
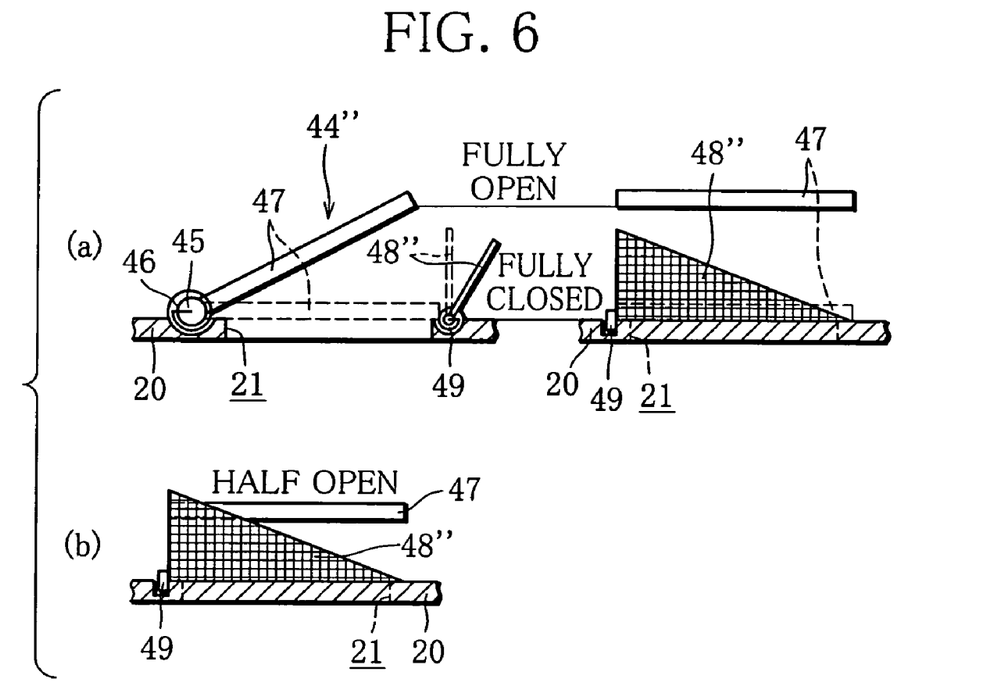
FIG. 6 is a detail view of an exhaust pressure-adjusting valve according to a third embodiment, showing a fully open position (a) and a half-open position (b)

FIG. 6 is a detail view of an exhaust pressure-adjusting valve 44" according to the third embodiment, showing a fully open position (a) and a half-open position (b). Hereinafter, the detail about the exhaust pressure-adjusting valve 44" according to the third embodiment will be explained with reference to FIG. 6.

As illustrated in FIG. 6, in the exhaust pressure-adjusting valve 44", a shield 48" is disposed upright in the outer circumferential surface of the exhaust pipe 20 to be positioned downstream of the exhaust flow from the opening hole 21 to sit at the circumferential edge of the opening hole 21.

Specifically, the shield 48" has a triangular shape obtained by cutting a rectangular plate along a diagonal line thereof, just like the shield 48' of the second embodiment. The shield 48" is turnably arranged upright in the outer circumferential surface of the exhaust pipe 20 to be aligned with the end of the valve element 47, just like the shield 48 of the first embodiment which is inverted. More specifically, the shield 48" has a coil spring 49 held between the shield 48" and the outer circumferential surface of the exhaust pipe 20 and is biased by the coil spring 49 to sit in a perpendicular position with respect to the outer circumferential surface of the exhaust pipe 20.

If the exhaust pressure-adjusting valve 44" is thus constructed, while the exhaust flow rate is low, and the resilience displacement of the coil spring 46 is small, it is difficult for the exhaust emission to flow downstream of the exhaust pressure-adjusting valve 44", and the exhaust pressure in the exhaust system is likely to rise. On the contrary, if the exhaust flow rate becomes high, and the resilience displacement of the coil spring 46 gets large, the shield 48" is pressed by the exhaust emission and then inclines against the biasing force of the coil spring 49. This results in more rapid enlargement of the valve-opening area than in the second embodiment. Thus the exhaust emission smoothly flows downstream through the exhaust pressure-adjusting valve 44", which entails better suppression of the rise of the exhaust pressure.

Consequently, it is possible to achieve both the effect of improving the exhaust emission quality and the combustion stability or the fuel consumption efficiency at the same time with a simple construction, more satisfactorily than the first and second embodiments.

Although the embodiments describe the cases in which the shield 48" is biased by the coil spring 49 to sit in a perpendicular position with respect to the outer circumferential surface of the exhaust pipe 20, another resilient body may be utilized in place of the coil spring 49. For example, the shield 48" per se may comprise a resilient member (such as a plate spring and a heat-resistant rubber).

Next, a fourth embodiment will be explained.

Figure 7:
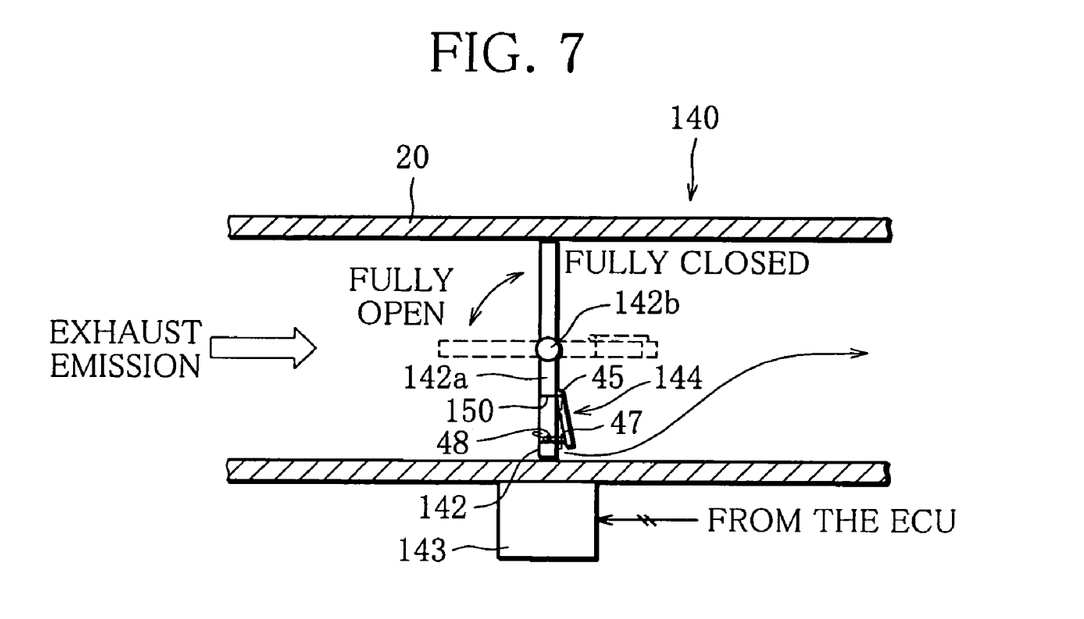
FIG. 7 is an enlarged view of an exhaust pressure-raising valve unit according to a fourth embodiment.

FIG. 7 shows, in an enlarged scale, an exhaust pressure-raising valve unit 140 according to the fourth embodiment of the exhaust pressure-raising device of the present invention. The explanation will be, provided with reference to the FIG. 7.

According to the fourth embodiment, the exhaust pressure-raising valve unit 140 comprises a butterfly valve 142 capable of adjusting the flow channel area of the exhaust pipe 20 and an exhaust pressure-adjusting valve 144 provided to the butterfly valve 142.

Arranged in the butterfly valve 142 is an actuator 143, and the butterfly valve 142 is operated by the actuator 143 to open and close.

The butterfly valve 142 has a valve element 142a that is provided with an opening hole 150 extending therethrough. The exhaust pressure-adjusting valve 144 is so arranged as to open and close the opening hole 150.

The construction of the exhaust pressure-adjusting valve 144 is similar to that of the exhaust pressure-adjusting valve 44 in the first embodiment if the exhaust pipe 20 is replaced with the valve element 142a, and the opening hole 21 with the opening hole 150. Therefore, details about the construction of the exhaust pressure-adjusting valve 144 are exactly the same as the foregoing, so that the explanation thereof will be omitted. In FIG. 7, the turning shaft 45 is located closer to the rotary shaft 142b of the butterfly valve 142 than the opening hole 150 is. In the fourth embodiment, however, the turning shaft 45 may be positioned at any places on the circumferential edge of the opening hole 150.

The operation of the exhaust pressure-raising device thus constructed, according to the fourth embodiment, will be described below.

For instance, if the water temperature sensor 54 detects that the engine 1 is in the cold state, and the butterfly valve 142 is therefore controlled by the ECU 50 to close, the butterfly valve 142 is brought into the fully closed position as shown by a solid line in FIG. 7. Subsequently, the exhaust pressure in the exhaust system (from the combustion chamber to the exhaust pipe) located upstream from the butterfly valve 142 begins to rise. The valve element 47 simultaneously starts to open by being pressed by the exhaust pressure, thereby increasing the valve-opening amount of the valve element 47 along with the rise of the exhaust flow rate.

At this point, as in the foregoing embodiment, the valve-opening area between the end of the shield 48 and the circumferential edge of the opening hole 150 is very small at first, but is gradually increased on the order of the square of the resilience displacement of the coil spring 46. Therefore, as long as the exhaust flow rate is low, and the resilience displacement of the coil spring 46 is small, it is difficult for the exhaust emission to flow downstream of the exhaust pressure-adjusting valve 144, and the exhaust pressure in the exhaust system rises without difficulty. On the contrary, if the exhaust flow rate is increased, and the resilience displacement of the coil spring 46 becomes great, the valve-opening area is rapidly enlarged, and the exhaust emission smoothly flows through the exhaust pressure-adjusting valve 144 to the downstream side. Accordingly, the rate of increase of the exhaust pressure in the exhaust system drops, which prevents the rise of the exhaust pressure.

As a result, regardless of an increase in the exhaust flow rate, the exhaust pressure is regulated to fall in the prescribed range to be kept substantially constant in response to the wide range of the exhaust flow rate (see FIG. 4). Thus, if the engine revolution speed Ne is low or the exhaust temperature is low, and the exhaust flow rate is small (for example, equal to or less than the prescribed exhaust flow rate Q1), the exhaust pressure is immediately raised to encourage the reactions of the unburnt materials, such as HC and CO, and oxygen or NOx. This makes it possible to achieve the reduction of the exhaust amount of hazardous substances and the early-activation of the three-way catalyst converter 30. On the contrary, if the engine revolution speed Ne becomes high or the exhaust temperature gets high, and the exhaust flow rate becomes great (for example, above the prescribed exhaust flow rate Q1), it is possible to suppress the excessive rise of the exhaust pressure, and thus to prevent deterioration in the combustion quality, attributable to an increase in the internal EGR and the like, and a decrease in fuel consumption efficiency, attributable to an increase in exhaust resistance.

In this case, too, it is desirable to return the butterfly valve 142 to the fully open position to stop the rise of the exhaust pressure due to the butterfly valve 142 when the exhaust flow rate reaches the prescribed exhaust flow rate Q2.

This makes it possible to provide a simple construction and reduce costs and to achieve both the effect of improving the exhaust emission quality and the combustion stability or the fuel consumption efficiency at the same time, as in the first embodiment.

In the above embodiment, the exhaust pressure-adjusting valve 44 of the first embodiment is applied to the exhaust pressure-adjusting valve 144. However, the exhaust pressure-adjusting valve 44' of the second embodiment or the exhaust pressure-adjusting valve 44" of the third may be applied to the exhaust pressure-adjusting valve 144.

Moreover, although the butterfly valve 142 with one exhaust pressure-adjusting valve 144 has been described here, the butterfly valve 142 may be provided with a plurality of the exhaust pressure-adjusting valves 144.

The description of embodiments of the exhaust pressure-raising device according to the present invention has been completed, but the embodiments are not limited to the aforementioned ones.

Figure 8:
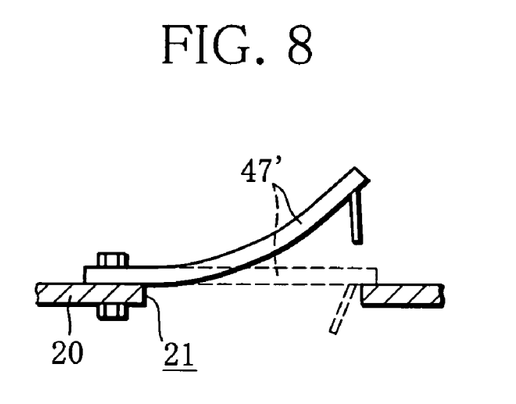
FIG. 8 is a view of an exhaust pressure-adjusting valve, a valve element of which is formed as a resilient member.

For example, the coil spring 46 is used to give a biasing force to the valve element 47 in the embodiments. It is possible, however, to utilize another resilient body in place of the coil spring 46. For instance, as illustrated in FIG. 8, the valve element 47 per se may comprise the resilient member 47' (for example, a plate spring or a heat-resistant rubber), and the turning shaft 45 per se may be formed as a torsion bar. By so doing, it is possible to provide a simpler construction and further reduce costs and to achieve both the effect of improving the exhaust emission quality and the combustion stability or the fuel consumption efficiency at the same time.

Also in the embodiments, the shields 48, 48' and 48" are each formed as a triangle obtained by cutting a rectangular plate along the diagonal line thereof, and the valve-opening areas of the exhaust pressure-adjusting valve 44, 44' and 44" are increased by degree on the order of the square of the resilience displacement of the coil spring 46. However, if the exhaust pressure-adjusting valves each have a property that allows the growth rate of the valve-opening area to increase little by little, the shield plates 48, 48' and 48" may be formed in any shape, e.g. a shape with curves, a polygon, etc.

The relation of the exhaust flow rate and the exhaust pressure in FIG. 4 may have a curvilinear characteristic as shown by solid line B, instead of having a broken-line characteristic by the solid line A.

Although in the embodiments, an intake-manifold injection type gasoline engine is employed as the engine 1, the engine 1 does not have to be limited to this type and may be of any kind.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust pressure-raising device for an internal combustion engine, comprising:
   a throttle valve disposed in an exhaust channel of an internal combustion engine and is adapted to close to reduce channel area of said exhaust channel and raise exhaust pressure in said exhaust channel; and
   an exhaust pressure-adjusting valve adapted to be brought into a closed position, in which the exhaust pressure-adjusting valve closes an opening for releasing the exhaust pressure in the exhaust channel, due to a biasing force of a resilient body and is adapted to open against the biasing force of the resilient body due to the exhaust pressure in the exhaust channel, which is raised in response to the closing of the throttle valve, in which an effective open area of the opening is increased or decreased according to displacement of the resilient body, to thereby adjust said raised exhaust pressure, wherein:
   the exhaust pressure-adjusting valve includes a valve element that closes the opening by the biasing force, and a shield provided independently from the valve element for changing the growth rate of the effective open area of the opening defined by the shield with respect to the displacement of valve element in a valve-opening direction.

2. The exhaust pressure-raising device for an internal combustion engine according to claim 1, wherein:
   said shield is disposed in a vicinity of the opening and faces an exhaust flow, and is obtained by cutting a rectangular plate along a diagonal line thereof.

3. The exhaust pressure-raising device for an internal combustion engine according to claim 1, wherein:
   said valve element is rotatably hinged at a vicinity of the opening and said resilient body urges the valve element toward a position that close the opening.

4. The exhaust pressure-raising device for an internal combustion engine according to claim 1, wherein:
   said throttle valve is a butterfly valve; and
   said exhaust pressure-adjusting valve is disposed in a valve element of said butterfly valve.

5. The exhaust pressure-raising device for an internal combustion engine according to claim 1, wherein:
   said shield extends from the valve element.

6. The exhaust pressure-raising device for an internal combustion engine according to claim 1, wherein:
   said valve element is made of the resilient body.

7. The exhaust pressure-raising device for an internal combustion engine according to claim 1, further comprising:
   a bypass channel that bypasses the throttle valve,
   wherein, the opening is an entry passage to the bypass channel.

8. The exhaust pressure-raising device for an internal combustion engine according to claim 1, wherein:
   said means for changing the growth rate of the valve-opening area changes the growth rate of said effective open area such that with regard to the relation of an exhaust flow rate and exhaust pressure, when the exhaust flow rate is lower than a first prescribed exhaust flow rate, the exhaust pressure rises toward first prescribed exhaust pressure in a short period of time, and when the exhaust flow rate becomes equal to or higher than said first prescribed exhaust flow rate, the exhaust pressure is reduced in rate of increase and falls in a range of from said first prescribed exhaust pressure to second prescribed exhaust pressure at the exhaust flow rate that is at least equal to or lower than a second prescribed exhaust flow rate.

9. The exhaust pressure-raising device for an internal combustion engine according to claim 8, wherein:
   said throttle valve raises the exhaust pressure in said exhaust channel at the exhaust flow rate equal to or lower than said second prescribed exhaust flow rate.

10. The exhaust pressure-raising device for an internal combustion engine according to claim 1, wherein:
    said shield extends from a circumferential portion the opening.

11. The exhaust pressure-raising device for an internal combustion engine according to claim 10, wherein:
    said shield is rotatably hinged at the circumferential portion the opening and urged toward a position that said shield obstructs a flow of an exhaust.

* * * * *